United States Patent [19]
Johnson

[11] 3,816,934
[45] June 18, 1974

[54] SCREW THREAD GAGE USING DRAG FOR TESTING
[75] Inventor: Stanley G. Johnson, West Hartford, Conn.
[73] Assignee: The Johnson Gage Company, Bloomfield, Conn.
[22] Filed: Oct. 29, 1971
[21] Appl. No.: 193,694

[52] U.S. Cl. ............................................. 33/199 R
[51] Int. Cl. ........ G01b 3/00, G01b 3/40, G01b 3/48
[58] Field of Search ...................... 33/199 R, 143 H

[56] References Cited
UNITED STATES PATENTS
| 386,842 | 7/1888 | Oehmen | 33/199 R |
| 1,130,866 | 3/1915 | Wells et al. | 33/199 R |
| 1,640,215 | 9/1927 | Peglow | 33/199 R |
| 2,736,102 | 2/1956 | Johnson | 33/199 R |

FOREIGN PATENTS OR APPLICATIONS
| 124,001 | 3/1919 | Great Britain | 33/199 R |

Primary Examiner—William D. Martin, Jr.
Assistant Examiner—Richard R. Stearns

[57] ABSTRACT

The screw thread gage disclosed enables an inexpensive gage to be provided because of the elimination of any indicator indicia or means upon the gage as well as elimination in the use of a micrometer in determining whether or not the test thread is within allowable tolerances. This result is secured solely by reliance on the frictional drag noted or the lack of drag for an unacceptable test thread, when the test thread or the gage is turned one upon the other. The gage uses two gaging members which are hinged together with spring pressure to expand the members for an internal gage and contract the members for an external gage. Two stops are provided, the first of which limits movement of the gaging members in one direction so that the gage must be threaded onto the test thread and the second stop means limits radial movement of the gage members in the other direction to the minimum material tolerance limit of an acceptable thread as determined by the standards for tolerance limits for the particular test thread. The gage construction may be for internal or external screw threads.

8 Claims, 4 Drawing Figures

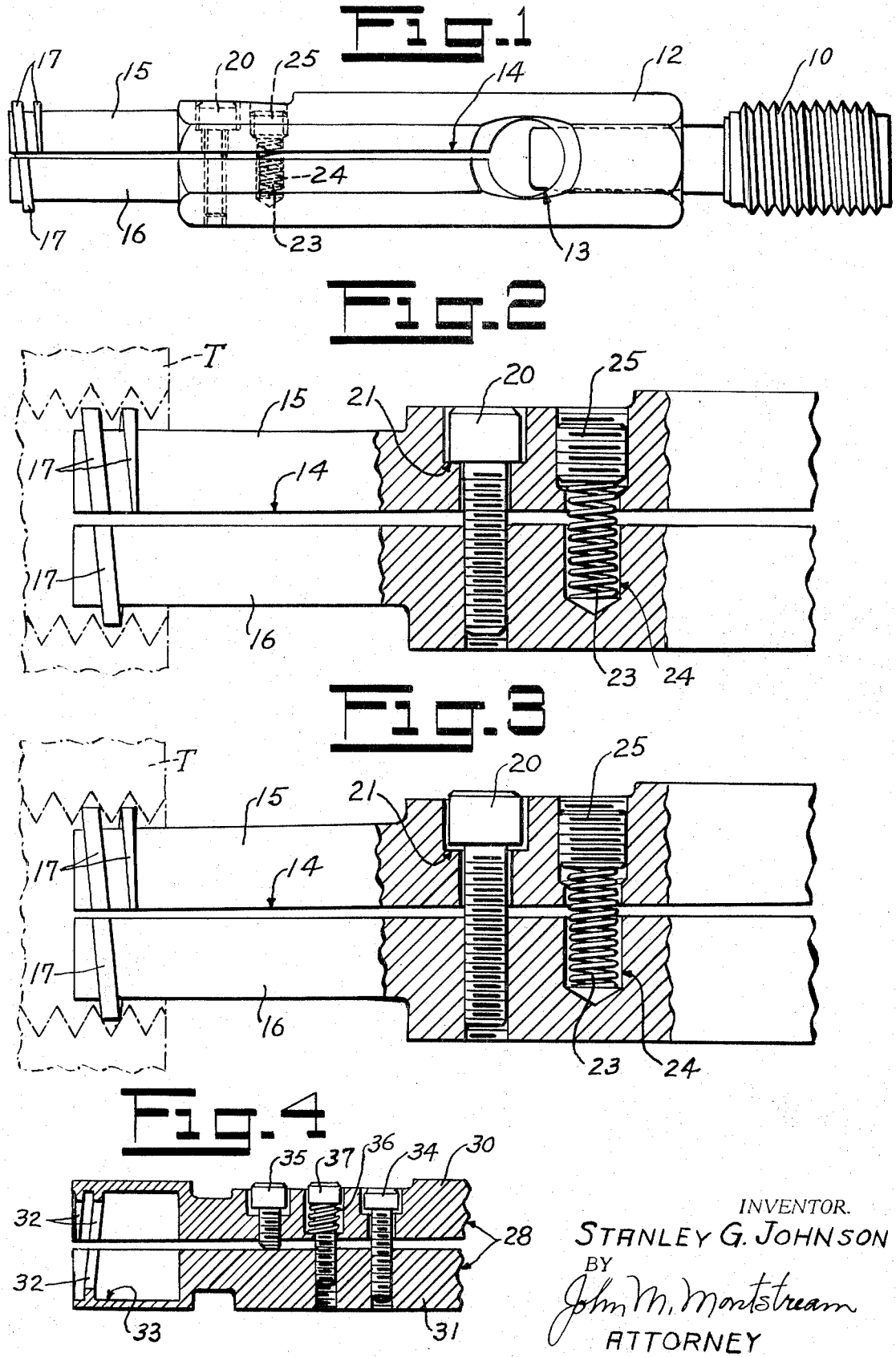

SCREW THREAD GAGE USING DRAG FOR TESTING

In a small shop, an investment in screw thread gages can be prohibitive and hence are rarely found as part of the equipment provided. The gage herein can be manufactured inexpensively so as to bring thread gages within the investment which can be made for a small shop, especially for gages in the more common sizes. The indicating portion of a gage represents a significant part of the cost of manufacturing such gage and its elimination as a part of the gage herein effects a substantial saving in the cost thereof. Also since the gage is designed to be threaded on the test thread or part there is no need for manual means to contract or expand the gaging members thereby further reducing the cost of the gage. The gage in using frictional drag in order to determine whether or not a test thread is within allowable tolerances introduces a new technique in thread gaging which is sufficiently accurate for most screw thread gaging. The gage in using drag feel for testing is effective also for determining taper, a staggered thread and an oval condition.

The principle object of the invention is to construct a thread gage having expandable and contractable gage members but without gaging indicia and which uses frictional drag when the gage or thread is turned one on the other to determine an acceptable test thread and lack of frictional drag to determine an unacceptable test thread, that is, one which is outside of the minimum material tolerance limits, and which provides stop means to limit the radial movement of the gaging members in the other direction so that the gage must be threaded upon the test thread thereby eliminating manual means for contracting or expanding the gage members.

Another object is to construct a screw thread gage which is simple and inexpensive because of the elimination of parts.

Other objects of the invention will be more apparent from the following description when taken in connection with the accompanying drawing illustrating a preferred embodiment thereof in which:

FIG. 1 is a side view of a gage for internal threads;

FIG. 2 is an enlarged view of the gage of FIG. 1 within an internal thread which is oversize;

FIG. 3 is an enlarged view of the gage of FIG. 1 engaging an acceptable screw thread; and, FIG. 4 is a sectional view of a part of a gage for an external screw thread.

In gaging internal screw threads, there are two basic tests to be made, first, that the test thread will assemble upon its mating external thread and, secondly, that the thread is not oversize or too large in diameter so that an inadequate or insecure clamping of the retained part results with the possibility that the threads will strip. The test for assembleability uses a thread plug 10 of a diameter at the maximum material tolerance limit. If the test thread will thread thereon it is known that the test thread will assemble on its mating thread. This test, however, does not tell whether or not the internal test thread is oversize.

For an external thread the basic tests are the same, namely, will the test thread assemble on its mating internal thread and, secondly, is the thread undersize so that an inadequate or insecure clamping results. The test for an external thread for thread assembly would be a ring gage (not shown). If the test thread is oversize it will not thread into the ring gage. This test will not tell whether or not the test thread is undersize. The ring gage will have a diameter which is the maximum material limit set out in tolerance tables for the particular thread.

The gage of FIG. 1 is for a ½ inch thread shown twice size and is used to determine whether or not an internal thread is within the minimum material tolerance limit or has a diameter greater than this tolerance limit. The gage has a body 12 one end of which carries a plug gage 10 for convenience, which is suitably fixed to the body such as by a taper. The body preferably has a hole 13 therethrough and a slot 14 extending lengthwise from the end to this hole forming two arms 15 and 16 the outer ends of which are expandable and contractable from the inner ends of the arms at the hole which ends serve as hinges. This construction is a simple way to provide a pair of arms hinged together at one end. At the outer ends of the arms is external helical screw thread ridge means 17 conforming in helix and diameter with the test thread and shown as about 1½ turns to form gage members on the radially movable ends of the arms. One arm, shown as the upper arm 15 has two gaging ridges forming in effect a V for engaging opposite flanks of one thread ridge of the test thread T and the other arm 16 has a single gaging ridge for engaging opposite flanks of the thread groove of the test part. So constructed the thread contact is at diametrically opposite points. The ridge form shown is square in cross section so that the corners engage the flanks of the screw thread at or about at the pitch diameter which is at or about at the midpoint of the thread flanks. The gaging ridge may be full V or part V form but preferably is sharp cornered or has a slight angular flattening which reduces wear on the gaging ridges. The number of turns may be greater than 1½, however, this number is preferred since then pitch deviation in the test thread has no effect on the performance or effectiveness of the gage.

The internal gage has two stop means one of which prevents contraction of the gage to such an extent that the gage members can not be axially inserted into the test thread but must be threaded therein. The purpose of this is two fold, firstly, if the inspector has to thread the gage into the test thread then he cannot avoid noting whether or not there is a taper, a stagger thread condition or an oval condition. Secondly, since the gage arms do not have to be contracted against relatively heavy spring pressure there is no need for a contracting handle and associated structure to effect contraction. As a consequence the gage is less expensive to manufacture because of the elimination of these additional parts. The simplest stop means for limiting contraction of the arms is to make the slot 14 narrow so that the faces of the slot engage and require threading of the gage into the test thread.

The second stop means is a screw 20 which is threaded into one arm 16 and passes through the other arm 15. The head of this screw engages the counter sink shoulder 21 and prevents expansion of the gaging members beyond the minimum material tolerance limit for the particular test thread. With this stop setting, a test thread which is within allowable tolerance will be engaged by the gaging ridge means 17 and such engagement can be felt by the frictional drag noted when one is turned on the other. If however, the test thread is oversize then the thread 17 will not frictionally engage the test thread and this is sensed by lack of any drag when one is turned on the other and such test thread is rejected. The use of a screw as this expansion stop means enables the gaging members to be adjusted to the minimum material tolerance limit for the internal thread being tested.

There is some resiliency in the hinge for expanding the gaging members, however, it is desirable to augment the opening pressure by a spring 23 which is received in a spring opening or bore 24 in the arms and spaced from the hinge. A retaining screw 25 in the arm 15 engages the end of the spring as an abutment and enables the spring pressure to be adjusted if desired.

In using the gage of FIGS. 1 to 3, the test thread is first threaded on the plug gage 10 to learn whether or not the test thread will assemble with its mating external thread. If the test thread will not thread on the plug 10 it is too small and is rejected. The gage members are then threaded into the test thread and if a frictional drag is felt it is known that the thread is within tolerance limits and is not too large. If no drag is felt it is known that the thread is too large and is rejected. The gage members are threaded for the full length of the test thread and if there is a variation in the drag from one end to the other it is known that this thread is tapered. If the variation in the drag is such that there is no drag over a substantial portion of the length of the test thread it is known that the taper is excessive and the test part is rejected. If the drag is greater in one position of the gage when turned a full revolution it is known that a stagger thread condition is present and if excessive the test part is rejected. If the drag is greater in two positions in a full revolution of the gage it is known that the test thread is oval and if excessive the part is rejected. It is clear that with this simple and inexpensive gage a great deal can be learned as to the more significant thread faults which do occur in internal threads.

The gage for external threads shown in FIG. 4 is basically the same as in the gage for internal threads and has a cylindrical body 28 with a longitudinally extending slot 29 dividing one end of the body into arms 30 and 31. In this gage the thread ridge 32 is on the inner surface of a bore 33 in the end of the body and has about 1½½ turns. In this gage two stops are provided one of which is a stop means shown as a screw 34 to limit the expansion of the gaging members formed by the ends of the arms so that the gage members must be threaded on the test thread and cannot be axially positioned thereon. A second stop means, shown as a screw 35, is provided in one arm 30 which engages the other arm to limit the contraction of the gage members to the minimum material tolerance limit for the test thread. A spring 36 in this gage operates to contract the arms and gaging members to bring the gaging ridges into contact with the test thread. A screw 37 threaded into the arm 31 engages one end of the spring and can be used to adjust its pressure. The second stop means or screw is adjustable so that the gaging members can be adjusted to limit contraction to the minimum material tolerance limit for the test thread.

An externally threaded test part is first threaded on a ring gage having a diameter corresponding with the maximum material tolerance limit which tells that the test thread will assemble with its mating internal thread. If the test thread will not thread into the ring gage it is known that this thread is too large. The gage herein is then threaded onto the test thread and if a frictional drag is felt when one is turned on the other it is known that the thread is large enough to be within the minimum material tolerance limit. If no drag is felt it is known that the test thread is too small to cause a drag and hence is below the allowable tolerance limit. The external thread gage is used in the same way as the internal thread gage for a test of taper, stagger thread and ovality.

Since the gage herein secures its low cost by the exclusion or non-use of all dimensional indicia and its cooperating means whether on the gage or by setting a part on the test thread and thereafter using a micrometer to measure the setting and the exclusion of such dimensional means is defined in some claims as the gage "consisting of" which includes the elements particularly recited and no others. The term "consisting of" is also used to define a gage which lacks or dispenses with manual means to contract an internal thread gage or expand an external thread gage and includes solely the elements recited.

The term minimum material or minimum metal tolerance limit as used herein is recognized in the art as directed to the pitch diameter tolerances. The term is applicable to both external and internal screw threads. For an internal thread it is the maximum pitch diameter which is acceptable and for an external thread it is the minimum pitch diameter which is acceptable according to standard tables used by the trade for each size and class of screw thread.

This invention is presented to fill a need for improvements in a screw thread gage using frictional drag for testing. It is understood that various modifications in structure, as well as changes in mode of operation, assembly and manner of use, may and often do occur to those skilled in the art, especially after benefiting from the teachings of an invention. This disclosure illustrates the preferred means of embodying the invention in useful form.

What is claimed is:

1. A screw thread gage using frictional drag for testing a test thread consisting of a pair of arms hinged together at one end thereof with a slot therebetween, said arms being movable toward and away from each other at the other end, screw thread ridge means conforming in helix and diameter with the test thread and carried by the movable ends of the arms forming gaging members, a first stop means carried by the arms limiting movement of the gaging members in one direction to a diameter so as to require the gaging members to threadably receive the test thread, a second stop means carried by the arms limiting movement of the gaging members in the other direction to the minimum material tolerance limit of the test thread so that the gaging members engage the test thread with frictional drag only when the test thread is within tolerance limits, and spring means pressing the arms in a direction to urge the gaging members toward the test thread to provide frictional drag for a test thread which is within tolerance limits.

2. A screw thread gage for an internal test thread as in claim 1 in which the slot between the arms is narrow with the faces thereof providing the first stop means, the screw thread ridge means being external, and the spring means pressing the arms and gaging members outwardly.

3. A screw thread gage for an external test thread as in claim 1 in which a cylindrical bore extends into the ends of the arms and the screw thread ridge means is internal in the bore, the spring means pressing the gaging members inwardly, and the first stop means being a screw carried by one arm and engaging the other arm to limit the outward expansion of the gaging members.

4. A screw thread gage as in claim 1 in which the screw thread ridge means is about 1½ turns.

5. A screw thread gage using frictional drag solely for determining that a test thread is within minimum material tolerance comprising a pair of arms hinged together at one end thereof with a slot therebetween, said arms being movable toward and away from each other at the other end, screw thread ridge means conforming in helix and diameter with the test thread and carried by the movable ends of the arms forming gaging members, a first stop means carried by the arms limiting movement of the gaging members in one direction to a diameter so as to require the gaging members to threadably receive the test thread, a second stop means carried by the arms limiting movement of the gaging members in the other direction to the minimum material tolerance limit of the test thread and restricting frictional drag solely to a test thread which is within minimum material tolerance limits, and spring means pressing the arms in a direction to urge the gaging members toward the test thread and to provide the frictional drag.

6. A screw thread gage for an internal test thread as in claim 5 in which the slot between the arms is narrow with the faces thereof providing the first stop means, the screw thread ridge means being external, and the spring means pressing the gaging members outwardly.

7. A screw thread gage for an external test thread as in claim 5 in which a cylindrical bore extends into the ends of the arms and the screw thread ridge means is internal in the bore, the spring means pressing the gaging members inwardly, and the first stop means being a screw carried by one arm and engaging the other arm to limit the expansion of the gaging members.

8. A screw thread gage as in claim 5 in which the screw thread ridge means is about 1½ turns.

* * * * *